United States Patent
Zhou et al.

(10) Patent No.: US 12,236,565 B2
(45) Date of Patent: Feb. 25, 2025

(54) METHOD AND APPARATUS FOR CLASSIFYING IMAGE OF DISPLAYING BASE PLATE

(71) Applicant: BOE Technology Group Co., Ltd., Beijing (CN)

(72) Inventors: Quanguo Zhou, Beijing (CN); Kaiqin Xu, Beijing (CN); Jiahong Zou, Beijing (CN); Guolin Zhang, Beijing (CN); Xun Huang, Beijing (CN); Qing Zhang, Beijing (CN); Zhidong Wang, Beijing (CN); Lijia Zhou, Beijing (CN); Hongxiang Shen, Beijing (CN); Jiuyang Cheng, Beijing (CN); Hao Tang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 656 days.

(21) Appl. No.: 17/476,321

(22) Filed: Sep. 15, 2021

(65) Prior Publication Data

US 2022/0245782 A1    Aug. 4, 2022

(30) Foreign Application Priority Data

Jan. 29, 2021   (CN) .......................... 202110129183.7

(51) Int. Cl.
*G06T 7/00* (2017.01)
*G06F 18/2413* (2023.01)
(Continued)

(52) U.S. Cl.
CPC ........ *G06T 7/0002* (2013.01); *G06F 18/2413* (2023.01); *G06N 3/08* (2013.01);
(Continued)

(58) Field of Classification Search
CPC .......... G06T 7/0002; G06T 5/50; G06T 7/55; G06T 7/0004; G06T 2207/20084;
(Continued)

(56) References Cited

U.S. PATENT DOCUMENTS

| | | | |
|---|---|---|---|
| 2014/0160277 A1* | 6/2014 | Lin | .................... G01N 21/8806 |
| | | | 348/125 |
| 2016/0172150 A1* | 6/2016 | Li | ........................ H01J 37/145 |
| | | | 250/396 ML |

(Continued)

OTHER PUBLICATIONS

Kim, Myeongso, et al. "Effective automatic defect classification process based on CNN with stacking ensemble model for TFT-LCD panel." Journal of Intelligent Manufacturing 31.5 (2020): 1165-1174.*

*Primary Examiner* — Xuemei G Chen
(74) *Attorney, Agent, or Firm* — IPro, PLLC

(57) ABSTRACT

A method for classifying an image of a displaying base plate includes: acquiring an image to be checked; from a first predetermined-type set, determining a type of the image to be checked. The first predetermined-type set includes: a first image type, a second image type and a third image type. An image of the first image type is a no-defect image, an image of the second image type is a blurred image, and an image of the third image type is a defect image. When the type of the image to be checked is the third image type, by using a first convolutional neural network, determining a defect data of the image to be checked, wherein the defect image refers to an image of a displaying base plate having a defect, and the defect data contains a defect type of the displaying base plate in the image to be checked.

19 Claims, 7 Drawing Sheets

(51) Int. Cl.
*G06N 3/08* (2023.01)
*G06T 5/50* (2006.01)
*G06T 7/55* (2017.01)
*G06V 10/44* (2022.01)

(52) U.S. Cl.
CPC .................. *G06T 5/50* (2013.01); *G06T 7/55* (2017.01); *G06V 10/443* (2022.01)

(58) Field of Classification Search
CPC ............. G06T 2207/30121; G06T 7/11; G06F 18/2413; G06F 18/214; G06F 18/241; G06N 3/08; G06N 3/045; G06V 10/443; G06V 10/82; G06V 10/98; G06V 2201/06
See application file for complete search history.

(56) References Cited

U.S. PATENT DOCUMENTS

| | | | |
|---|---|---|---|
| 2017/0372155 A1* | 12/2017 | Odry | G06F 18/28 |
| 2018/0005205 A1* | 1/2018 | Redd | G06Q 20/3221 |
| 2019/0197679 A1* | 6/2019 | Fang | G06N 3/084 |
| 2020/0050923 A1* | 2/2020 | Patney | G06T 5/60 |
| 2020/0058115 A1* | 2/2020 | Mimura | H04N 1/00005 |
| 2020/0117960 A1* | 4/2020 | Yan | G06V 30/248 |
| 2020/0124541 A1* | 4/2020 | Yasue | G01N 21/898 |
| 2020/0279354 A1* | 9/2020 | Klaiman | G06N 20/00 |
| 2020/0357105 A1* | 11/2020 | Shahmehri | G06V 10/764 |
| 2021/0012027 A1* | 1/2021 | Adams | G06F 21/602 |
| 2021/0027454 A1* | 1/2021 | Peng | G06T 7/0004 |
| 2021/0158524 A1* | 5/2021 | Madabhushi | G06T 7/11 |
| 2021/0183038 A1* | 6/2021 | Xu | G06F 18/24 |
| 2021/0209739 A1* | 7/2021 | Wen | H01M 10/4285 |
| 2021/0304123 A1* | 9/2021 | Vanapalli | G06V 10/774 |
| 2022/0188577 A1* | 6/2022 | Chopde | G06V 10/82 |

* cited by examiner

METHOD AND APPARATUS FOR CLASSIFYING IMAGE OF DISPLAYING BASE PLATE

The application claims priority to Chinese Patent Application No. 202110129183.7, entitled "METHOD AND APPARATUS FOR CLASSIFYING IMAGE OF DISPLAYING BASE PLATE", filed with the China National Intellectual Property Administration on Jan. 29, 2021, which is incorporated herein by reference in its entirety.

TECHNICAL FIELD

The present disclosure relates to the field of image processing, and particularly relates to a method and apparatus for classifying an image of a displaying base plate.

BACKGROUND

With the continuous development of technology, increasingly more images require to be classified. Currently, images are classified generally artificially.

SUMMARY

The embodiments of the present disclosure provide a method and apparatus for classifying an image of a displaying base plate.

The embodiments of the present disclosure employ the following technical solutions:

in the first aspect, there is provided a method for classifying an image of a displaying base plate, wherein the method comprises:

acquiring an image to be checked;

from a first predetermined-type set, determining a type of the image to be checked, wherein the first predetermined-type set comprises: a first image type, a second image type and a third image type, wherein an image of the first image type is a no-defect image, an image of the second image type is a blurred image, and an image of the third image type is a defect image; and on a condition that the type of the image to be checked is the third image type, by using a first convolutional neural network, determining defect data of the image to be checked, wherein the defect image refers to an image of a displaying base plate having a defect, and the defect data contains a defect type of the displaying base plate in the image to be checked.

In some embodiments, the step of determining the type of the image to be checked comprises:

acquiring product data of the displaying base plate in the image to be checked, wherein the product data comprises: shape data and/or structure data of the displaying base plate;

matching the product data of the displaying base plate in the image to be checked with a pre-configured product data;

on a condition that the product data of the displaying base plate in the image to be checked and the pre-configured product data completely match, determining that the type of the image to be checked is the first image type;

on a condition that the product data of the displaying base plate in the image to be checked and the pre-configured product data do not match at all, determining that the type of the image to be checked is the second image type; and on a condition that the product data of the displaying base plate in the image to be checked and the pre-configured product data partially match, determining that the type of the image to be checked is the third image type.

In some embodiments, the step of acquiring the product data of the displaying base plate in the image to be checked comprises:

by using an image-recognition algorithm, acquiring shape data and/or structure data of pixels in the displaying base plate in the image to be checked.

In some embodiments, the step of determining the type of the image to be checked comprises:

performing binarization processing to the image to be checked, to obtain a black-and-white graph of the image to be checked;

on a condition that the black-and-white graph of the image to be checked has periodical changes, determining that the type of the image to be checked is the first image type;

on a condition that the black-and-white graph of the image to be checked does not have periodical changes, determining that the type of the image to be checked is the second image type; and on a condition that the black-and-white graph of the image to be checked partially has periodical changes, determining that the type of the image to be checked is the third image type.

In some embodiments, the step of determining the type of the image to be checked comprises:

by using a second convolutional neural network, determining an image type of the image to be checked.

In some embodiments, the step of acquiring the image to be checked comprises:

scanning an image storing device;

determining that a newly added image-information storage file exists in the image storing device, wherein the image-information storage file includes an image file and an address file;

parsing the address file in the image-information storage file, to obtain an image storage address in the address file; and acquiring an image corresponding to the image storage address from the image file, to regard the image as the image to be checked.

In some embodiments, the step of, by using a first convolutional neural network, determining the defect data of the image to be checked comprises:

by using the first convolutional neural network, determining the defect type of the image to be checked from the second predetermined-type set, wherein the second predetermined-type set comprises at least one defect type. The method for classifying an image of a displaying base plate further comprises: on a condition that the defect type of the image to be checked is not in the second predetermined-type set, outputting the image to be checked, and receiving a first newly created defect type that is inputted by a user.

In some embodiments, the method for classifying an image of a displaying base plate further comprises:

adding the first newly created defect type into the second predetermined-type set, to update the first convolutional neural network.

In some embodiments, the defect data further comprises: a confidence corresponding to the defect type, wherein the confidence corresponding to the defect type refers to a confidence with which the displaying base plate in the image to be checked is of the defect type; and the method further comprises
on a condition that the confidence is less than a preset threshold, outputting the image to be checked, and receiving a rechecking result that is inputted by the user; and
on a condition that the rechecking result indicates that the defect type in the defect data of the image to be checked is incorrect, according to the rechecking result, rectifying the defect type in the defect data of the image to be checked.

In the second aspect, there is provided an apparatus for classifying an image of a displaying base plate, wherein the apparatus for classifying an image of a displaying base plate comprises: an acquiring module and a processing module;
the acquiring module is configured for acquiring an image to be checked;
the processing module is configured for, from a first predetermined-type set, determining a type of the image to be checked acquired by the acquiring module, wherein the first predetermined-type set comprises: a first image type, a second image type and a third image type, wherein an image of the first image type is a no-defect image, an image of the second image type is a blurred image, and an image of the third image type is a defect image; and
the processing module is further configured for, on a condition that the type of the image to be checked is the third image type, by using a first convolutional neural network, determining defect data of the image to be checked, wherein the defect image refers to an image of a displaying base plate having a defect, and the defect data contains a defect type of the displaying base plate in the image to be checked.

In the third aspect, there is provided an apparatus for classifying an image of a displaying base plate, wherein the apparatus for classifying an image of a displaying base plate comprises: a memory and a processor, the memory is configured to store a computer instruction, and the processor is configured to execute the computer instruction, to cause the displaying base plate to implement the method for classifying an image of a displaying base plate according to any one of the above embodiments.

In the fourth aspect, there is provided a nonvolatile computer-readable storage medium, wherein the computer-readable storage medium is configured to store a computer instruction, whereby an apparatus for classifying an image of a displaying base plate, when executing the computer instruction, implements the method for classifying an image of a displaying base plate according to any one of the above embodiments.

The above description is only an overview of the technical solution of this disclosure, which can be implemented according to the contents of the specification in order to understand the technical means of this disclosure more clearly, and in order to make the above and other objects, features and advantages of this disclosure more obvious and understandable, the detailed description of this disclosure will be given below.

BRIEF DESCRIPTION OF THE DRAWINGS

In order to more clearly illustrate the technical solutions of the embodiments of the present disclosure, the figures that are required to describe the embodiments or the prior art will be briefly introduced below. Apparently, the figures that are described below are merely embodiments of the present disclosure, and a person skilled in the art can obtain other figures according to these figures without paying creative work.

DETAILED DESCRIPTION

Figure 1:
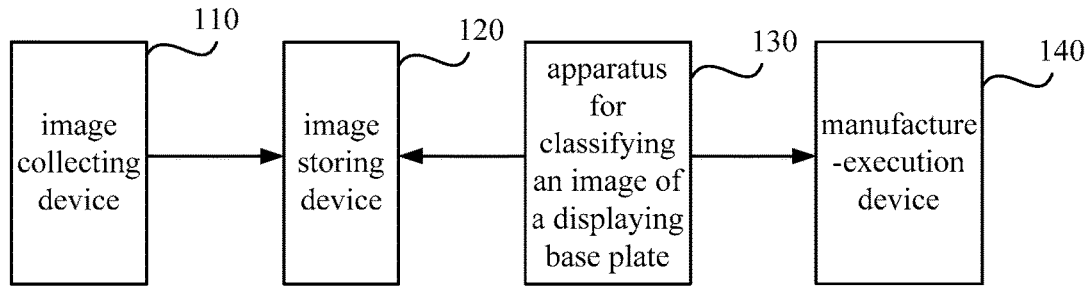
FIG. 1 is a structural diagram of the integrated computer manufacturing system according to an embodiment of the present disclosure.

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Unless stated otherwise in the context, throughout the description and the claims, the term "comprise" and other forms thereof, for example, the singular from in third personal "comprises" and the present participle "comprising", are interpreted as the meaning of opened containing, i.e., "including but not limited to". In the description of the present disclosure, the terms "one embodiment", "some embodiments", "exemplary embodiments", "example", "specific example" or "some examples" are intended to indicate that specific features, structures, materials or characteristics related to the embodiment or example are comprised in at least one embodiment or example of the present disclosure. The illustrative indication of the above terms does not necessarily refer to the same one embodiment or example. Moreover, the specific features, structures, materials or characteristics may be comprised in any one or more embodiments or examples in any suitable manner.

In the following, the terms "first" and "second" are merely for the purpose of describing, and should not be construed as indicating or implying the degrees of importance or implicitly indicating the quantity of the specified technical features. Accordingly, the features defined by "first" or "second" may explicitly or implicitly comprise one or more of the features. In the description of the embodiments of the present disclosure, unless stated otherwise, the meaning of "plurality of" is "two or more".

In the description on some embodiments, "couple" and "connect" and the derivatives thereof may be used. For example, in the description on some embodiments, the term "connect" may be used to indicate that two or more components directly physically contact or electrically contact. As another example, in the description on some embodiments, the term "couple" may be used to indicate that two or more components directly physically contact or electrically contact. However, the term "couple" or "communicatively coupled" may also indicate that two or more components do not directly contact, but still cooperate with each other or act on each other. The embodiments disclosed herein are not necessarily limited by the contents herein.

"At least one of A, B and C" and "at least one of A, B or C" have the same meaning, and both of them include the following combinations of A, B and C: solely A, solely B, solely C, the combination of A and B, the combination of A and C, the combination of B and C, and the combination of A, B and C.

"A and/or B" include the following three combinations: solely A, solely B, and the combination of A and B.

"Plurality of" refers to "at least two".

The "adapted for" or "configured for" as used herein is intended as opened and inclusive languages, and does not exclude apparatuses adapted for or configured for executing additional tasks or steps.

In addition, the "based on" as used is intended as opened and inclusive, because a process, step, calculation or other action "based on" one or more described conditions or values may, in practice, be based on an additional condition or exceed the described values.

The displaying device may be an LCD (Liquid Crystal Display) device, and may also be a self-illuminating displaying device, such as an OLED (Organic Light Emitting Diode) displaying device, a QLED (Quantum Dot Light Emitting Diodes) displaying device and a Micro LED (Micro Light-Emitting Diode) displaying device. As an example, the displaying device comprises an array base plate. In an LCD, the array base plate may be referred to as a TFT array base plate, and, in an OLED, an QLED, a Micro LED and so on, the array base plate may be a driving backplane comprising a pixel circuit.

In the present embodiment, the displaying base plate may be a relevant product of the displaying device, i.e., the product obtained in the fabrication process of the displaying device after at least one process step has been completed. As an example, in an LCD displaying device, the displaying base plate may be a TFT array base plate or a face matching base plate, and, in a self-illuminating displaying device, the displaying base plate may be a driving backplane.

The production process of the displaying base plate comprises multiple process steps, and the products obtained in some of the process steps (at least one process step) are required to be checked, to determine the data of the displaying base plate such as the defect type.

In the present embodiment, the image of the displaying base plate refers to an image of the product obtained in the production process of the displaying base plate after at least one process step has been completed, and, particularly, may refer to the base plate obtained by forming at least one pattern layer on the substrate base plate. The pattern layer refers to the pattern formed on the substrate base plate by using a patterning process.

For example, the process step of fabricating the displaying base plate comprised in an LCD may comprise: forming sequentially on the substrate base plate a grid metal pattern layer (comprising the grid lines and the grids of the TFT), an active layer, a source-drain metal pattern layer (comprising the sources of the TFT, the drains of the TFT and the data lines) and so on. The substrate base plate on which the grid metal pattern layer has already been formed is a relevant product of the displaying base plate (for example, referred to as the product A); the substrate base plate on which the grid metal pattern layer and the active layer have already been formed is another relevant product of the displaying base plate (for example, referred to as the product B); and the substrate base plate on which the grid metal pattern layer, the active layer and the source-drain metal pattern layer have already been formed is yet another relevant product of the displaying base plate (for example, referred to as the product C), and so on.

Taking the checking on the defect of the relevant product of the displaying base plate comprised in an LCD as an example, the process may comprise firstly, by using an image collecting device, collecting an image of the relevant product, and then determining the defect type of the collected image.

As shown in FIG. 1, an embodiment of the present disclosure provides a Computer Integrated Manufacturing (CIM) system 100. The CIM system may comprise an image collecting device 110, an image storing device 120, an apparatus for classifying an image of a displaying base plate 130 and a manufacture-execution device 140.

The image collecting device is configured for collecting an image of the relevant product of the displaying base plate in an LCD, and sending the collected image to the image storing device. The image storing device is configured for storing the image collected by the image collecting device. The apparatus for classifying an image of a displaying base plate is configured for classifying the image stored in the image storing device, and sending the classification result to the manufacture-execution device. The manufacture-execution device is configured for receiving the classification result sent by the apparatus for classifying an image of a displaying base plate.

As an example, the image collecting device may be an AOI (Automatic Optical Inspection) device.

A person skilled in the art should understand that AOI devices are checking devices that are extensively used in industries such as liquid crystal and microelectronics.

The type of the image storing device is not limited in the present embodiment. As an example, the image storing device may be a device that creates a database, wherein the database may be a relational database, and may store the picture data of multiple images and the images corresponding to them. As another example, the image storing device may be a Distributed File System (DFS); for example, the distributed file system comprises a client and a server. As yet another example, the image storing device may be a File Transfer Protocol (FTP); for example, the file transfer protocol comprises a FTP server and a FTP client. As still another example, the image storing device may be a Network Attached Storage (NAS) device.

Figure 2:
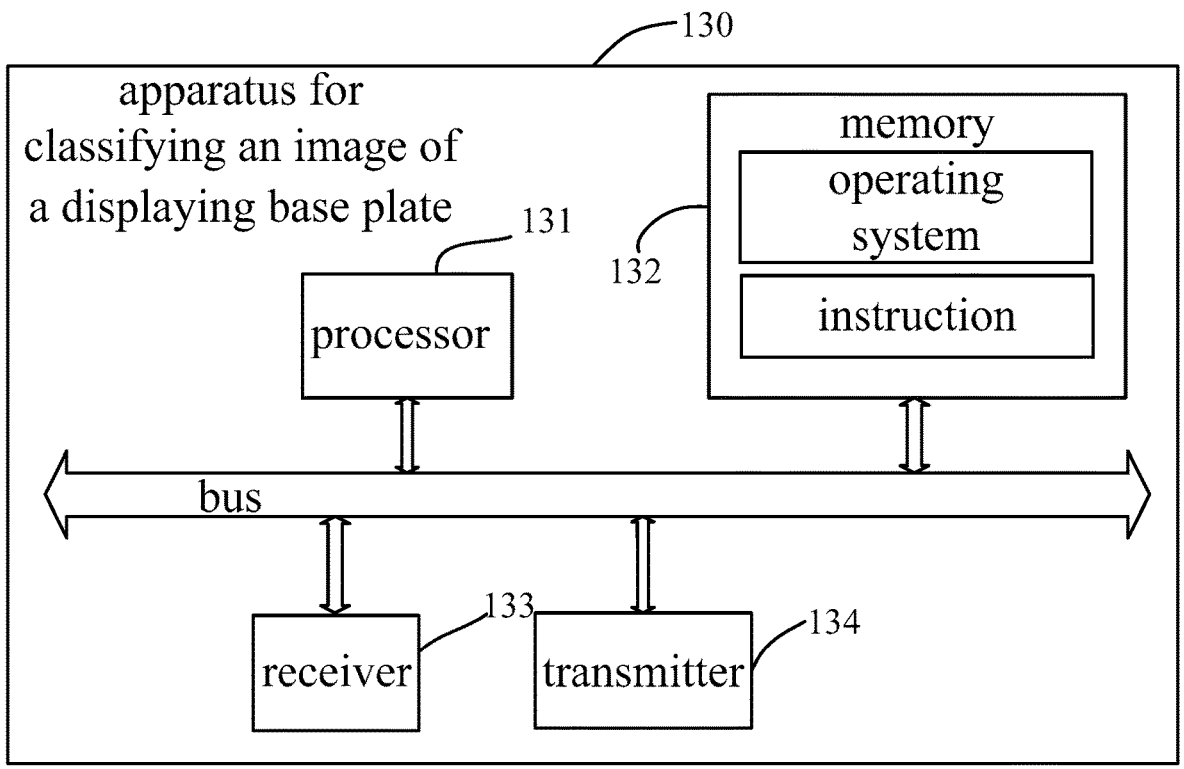
FIG. 2 is a structural diagram of the apparatus for classifying an image of a displaying base plate according to an embodiment of the present disclosure.

In some embodiments, as shown in FIG. 2, the apparatus for classifying an image of a displaying base plate 130 may comprise at least one processor 131 and a memory 132.

The processor 131 may be one or more generic central processing units (CPU), microprocessors, and application-specific integrated circuits (ASIC), or an integrated circuit for controlling the execution of the program according to some embodiments of the present disclosure, wherein the CPU may be a single-core processer (single-CPU) or a multi-core processor (multi-CPU). Here, a processor 301 may refer to one or more devices, electric circuits, or processing cores for processing data (for example, computer program instructions).

The memory 132 may store an operating system and an instruction (for example, a computer instruction), and includes but is not limited to a random access memory (RAM), a read only memory (ROM), an erasable programmable read-only memory (EPROM), a flash memory, or an optical memory, and so on. The memory 202 stores the code of the operating system.

As an example, the processor 131, by reading the instruction stored in the memory 132, causes the apparatus for classifying an image of a displaying base plate 130 to implement the method for classifying an image of a displaying base plate according to the following embodiments, to determine the defect type of the displaying base plate in the image to be checked. Alternatively, the processor 131, by using an instruction stored internally, causes the apparatus for classifying an image of a displaying base plate 130 to implement the method for classifying an image of a displaying base plate according to the following embodiments, to determine the defect type of the displaying base plate in the image to be checked. In the case in which the processor 131 implements the method according to the following embodiments by reading the instruction stored in the memory 132, the memory 132 stores an instruction for implementing the method for classifying an image of a displaying base plate according to the present embodiment.

In other embodiments, the apparatus for classifying an image of a displaying base plate 130 in FIG. 2 may further comprise a receiver 133 and a transmitter 134.

The receiver 133 is configured for receiving the image stored in the image storing device. For example, the receiver 133 may be communicatively connected to a routing device by wired or wireless communication, to receive the image sent by the routing device.

The transmitter 134 may be communicatively connected to a terminal by wired or wireless communication, and is configured for sending the defect type of the displaying base plate in the image to be checked to the terminal.

Figure 3:
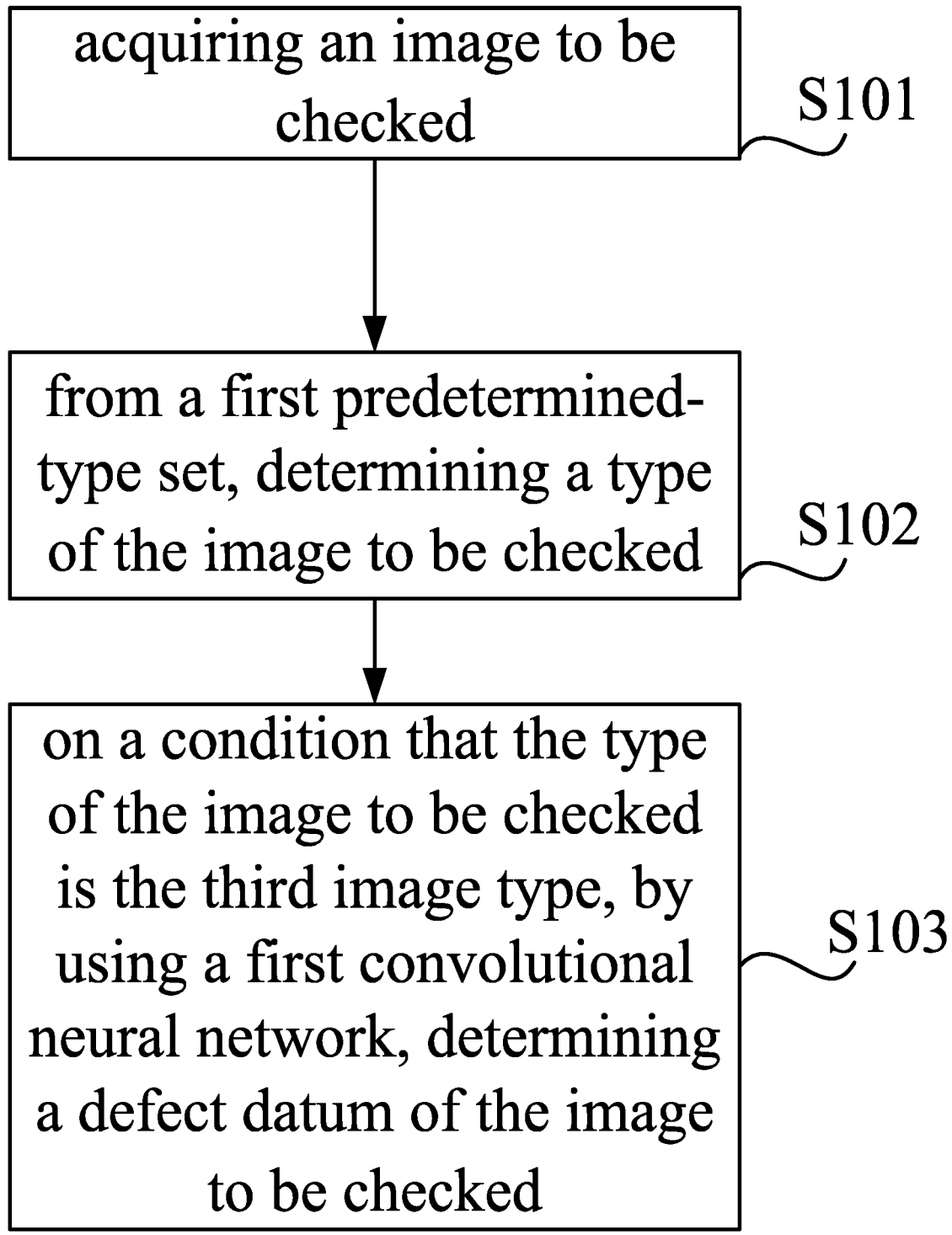
FIG. 3 is a flow chart of the method for classifying an image of a displaying base plate according to an embodiment of the present disclosure.

As shown in FIG. 3, an embodiment of the present disclosure provides a method for classifying an image of a displaying base plate. The subject of the implementation of the method may be the CIM system, and may also be the apparatus for classifying an image of a displaying base plate, or hardware and/or software in the apparatus for classifying an image of a displaying base plate, for example, the combination between the processor and the memory, or the computer program of an Automated Defect Classification (ADC) system. The method for classifying an image of a displaying base plate comprises the following S101-S103.

S101: acquiring an image to be checked.

The image to be checked is an image of the displaying base plate collected by using the AOI device.

As an example, regarding 25 displaying base plates included in the same one lot, the AOI device collects the images PA1-PA25 of the products A1-A25, collects the images PB1-PB25 of the products B1-B25, and collects the images PC1-PC25 of the products C1-C25.

In some embodiments, S101 may particularly be implemented by the following steps A1-A4.

A1: scanning an image storing device.

As an example, after the AOI device has collected completely this lot of images, i.e., after it has collected completely the images PA1-PA25, PB1-PB25 and PC1-PC25, the AOI device saves those collected images into an image file (for example, a .Qpanel file), saves the image storage addresses corresponding to those images into an address file (for example, a .Glass file), saves the image file and the address file into an image-information storage file (for example, a .lot file), and subsequently sends the .lot file and device data of the AOI device to the image storing device. The apparatus for classifying an image of a displaying base plate scans the image storing device at a certain time interval (for example, 10 minutes).

It should be noted that the contents saved into the .Qpanel file are not limited in the present embodiment. As an example, the .Qpanel file saves the image collected by the AOI device. As another example, the .Qpanel file saves the data of the displaying base plate, for example, the data such as the model of the displaying base plate.

It should be noted that the time interval at which the apparatus for classifying an image of a displaying base plate scans the image storing device is not limited in the present embodiment. As an example, the scanning time interval may be 5 minutes, and may also be 15 minutes.

A2: determining that a newly added image-information storage file exists in the image storing device, wherein the image-information storage file includes an image file and an address file.

The image file refers to the file that saves the image to be checked collected by the AOI device, for example, the .Qpanel file. The address file refers to the file that saves the image storage addresses corresponding to the images to be checked, for example, the .Glass file. The image-information storage file refers to the file that saves the image file and the address file, for example, the .lot file.

A3: parsing the address file in the image-information storage file, to obtain an image storage address in the address file.

A4: acquiring from the image file an image corresponding to the image storage address, as the image to be checked.

As an example, the apparatus for classifying an image of a displaying base plate scans the image storing device every 10 minutes, to determine whether a newly added .lot file exists in the image storing device. If the apparatus for classifying an image of a displaying base plate determines that a newly added .lot file exists in the image storing device, the apparatus for classifying an image of a displaying base plate parses the .Glass file saved in the .lot file, to obtain the image storage addresses saved in the .Glass file, and, in turn, according to the obtained image storage address, acquires from the .Qpanel file an image corresponding to the image storage address, as the image to be checked.

In the present embodiment, each of the images to be checked may be executed the following S102 and S103.

S102: from a first predetermined-type set, determining a type of the image to be checked.

The first predetermined-type set comprises: a first image type, a second image type and a third image type, wherein an image of the first image type is a no-defect image, an image of the second image type is a blurred image, and an image of the third image type is a defect image.

As an example, the no-defect image refers to an image of a displaying base plate that does not have a defect, the blurred image refers to that the photographed image is blurred, and the defect image refers to an image of a displaying base plate having a defect. On the condition that the type of the image to be checked is a no-defect image or a blurred image, the following S103 is not executed; for example, the image to be checked may be deleted, or, the image to be checked may be outputted together with its type. On a condition that the type of the image to be checked is a defect image, the following S103 is executed.

In some embodiments, the step of determining the type of the image to be checked in S102 may particularly be implemented by the following steps B1-B3.

B1: acquiring product data of the displaying base plate in the image to be checked.

The product data comprises: shape data and/or structure data of the displaying base plate.

As an example, this step may comprises, by using an image-recognition algorithm, acquiring product data of the displaying base plate in the image to be checked.

In the present embodiment, the algorithm principle of the image-recognition algorithm is an algorithm formed based on Convolutional Neural Networks (CNNs).

As an example, the image to be checked is inputted into the convolutional neural network, and image features are extracted by using a deep feature extracting network comprised in the convolutional neural network, thereby obtaining the product data of the displaying base plate in the image to be checked.

In the present embodiment, the shape data of the displaying base plate refers to, after at least one pattern layer has been formed on the substrate base plate, the shape data of the at least one formed pattern layer. As an example, in the case in which the displaying base plate in the image to be checked is formed with a grid metal pattern layer, the shape data of the displaying base plate may be the shape of the grid lines.

The structure data of the displaying base plate refers to, after at least two (two or more) pattern layers have been formed on the substrate base plate, the mode of the connection between the at least two formed pattern layers. As an example, in the case in which the displaying base plate in the image to be checked is formed with a grid metal pattern layer, an active layer and a source-drain metal pattern layer, the structure data of the displaying base plate may be the mode of the connection between the three layers. For example, the connection mode may be that the data lines and the TFT sources are connected by via holes, or that the data lines and the TFT sources are connected by another feasible mode.

In some embodiments, the step B1 may comprise: by using an image-recognition algorithm, acquiring shape data and/or structure data of pixels in the displaying base plate in the image to be checked.

The pixel in the displaying base plate refers to, in the displaying region (Active Area, AA) of the displaying base plate, the smallest repeating units distributed in the row direction and in the column direction. In the case in which the displaying base plate is the array base plate comprised in an LCD, each of the smallest repeating units comprises a pixel electrode and a thin-film transistor connected to the pixel electrode. In the case in which the displaying base plate is the driving backplane comprised in a self-illuminating displaying device (for example, an OLED), each of the smallest repeating units is the pixel circuit providing a driving signal to a light emitting unit.

Taking the case in which the displaying base plate is the array base plate in an LCD as an example, the shape data of the pixels is the shape of the pixel electrode in each of the smallest repeating units. For example, the shape of the pixel electrode may be the shape of a single-domain pixel electrode, and may also be the shape of a multidomain (for example, two domain) pixel electrode.

The structure data of the pixels refers to, in each of the smallest repeating units, the mode of the connection between the pixel electrode and the thin-film transistor TFT. For example, the pixel electrode and the thin-film transistor TFT are connected by a via hole.

B2: matching the product data of the displaying base plate in the image to be checked with a pre-configured product data.

The pre-configured product data refers to the product data of a standard product (a product having no defect). As an example, the apparatus for classifying an image of a displaying base plate is pre-configured with the product data of the relevant products of the displaying base plate, for example, the shape data and/or the structure data of the displaying base plate formed with a grid metal pattern layer, the shape data and/or the structure data of the displaying base plate formed with a grid metal pattern layer and an active layer, the shape data and/or the structure data of the displaying base plate formed with a grid metal pattern layer, an active layer and a source-drain metal pattern layer, and the shape data and/or the structure data of the pixels in the displaying base plate.

As an example, this step may comprise firstly, by using the convolutional neural network, learning the pre-configured product data of the displaying base plate formed with a grid metal pattern layer that is stored in the apparatus for classifying an image of a displaying base plate; in other words, firstly causing the convolutional neural network to remember the pre-configured product data of the displaying base plate formed with the grid metal pattern layer, and subsequently comparing to determine whether the product data of the displaying base plate formed with the grid metal pattern layer in the image to be checked and the pre-configured product data are the same; if yes, determining that they match; and if no, determining that they do not match.

As another example, this step may comprise firstly, by using the convolutional neural network, learning the pre-configured shape data and/or structure data of the pixels in the displaying base plate that are stored in the apparatus for classifying an image of a displaying base plate; in other words, firstly causing the convolutional neural network to remember the pre-configured shape data and/or structure data of the pixels in the displaying base plate, and subsequently comparing to determine whether the shape data and/or structure data of the pixels in the image to be checked and the pre-configured shape data of the pixels are the same; if they are approximately the same, determining that they match; and if no, determining that they do not match.

The results of matching include: the product data of the displaying base plate in the image to be checked and the pre-configured product data completely match, do not match at all, or partially match.

As an example, the completely matching refers to that the pre-configured shape data and structure data of the product and the shape data and the structure data of the displaying base plate in the image to be checked are completely the same. The not matching at all refers to that the pre-configured shape data and structure data of the product and the shape data and the structure data of the displaying base plate in the image to be checked are completely different. The partially matching refers to that the pre-configured shape data of the product and the shape data of the displaying base plate in the image to be checked are the same, but the structure data are different. Alternatively, the partially matching refers to that the pre-configured structure data of the product and the structure data of the displaying base plate in the image to be checked are the same, but the shape data are different.

A person skilled in the art should understand that convolutional Neural Networks (CNNs) are formed by the 5-layered structure of an input layer, a convolutional layer, a pooling layer, a fully connected layer and an output layer, and is a deep feedforward artificial neural network. Its artificial neurons can respond to the peripheral units within part of the coverage area. CNNs have an excellent performance in large-scale image processing, and currently have already been applied in the field of image recognition.

As an example, in the case in which the displaying base plate in the image to be checked is formed with grid lines, the shape of the grid lines is matched with the pre-configured shape data of the grid lines. If the shapes of them are completely the same, then it can be considered that the product data of them completely match. If the shapes of them are completely different, then it can be considered that the product data of them do not match at all.

As another example, in the case in which the displaying base plate in the image to be checked is formed with data lines and TFT sources, the structure data between the data lines and the TFT sources (for example, the connection mode) is matched with the pre-configured connection mode between the data lines and the TFT sources. If the data lines and the TFT sources in the image to be checked are connected by via holes, but the pre-configured data lines and TFT sources are not connected by via holes, then it can be considered that the structure data of them do not match at all.

As yet another example, in the case in which the displaying base plate is the array base plate comprised in an LCD, taking the case as an example in which the shape data of the pixels is the shape data of all of the pixels in the array base plate, the shape data of all of the pixels in the array base plate are matched with the pre-configured shape data of the pixels. If the shape data of all of the pixels in the displaying base plate in the image to be checked and the pre-configured shape data of the pixels are completely the same, then it is considered that they completely match. If the shape data of some of the pixels in the displaying base plate in the image to be checked and the pre-configured shape data of the pixels can match, and the shapes of the other part of the pixels in the image to be checked and the pre-configured shape of the pixels, when being matched, have a difference (for example, deficiency, a foreign matter (particles) and so on exists), then it is considered that they partially match. If the shape data of all of the pixels in the displaying base plate in the image to be checked and the pre-configured shape data of the pixels are completely different, then it is considered that they do not match at all.

As still another example, in the case in which the displaying base plate is the array base plate comprised in an LCD, taking the case as an example in which the shape data of the pixels is the shape data of one pixel in the array base plate, the shape data of the one pixel in the array base plate is matched with the pre-configured shape data of the pixels. If the shape data of the one pixel in the displaying base plate in the image to be checked and the pre-configured shape data of the pixels are completely the same, then it is considered that they completely match. If the shape data of the one pixel in the displaying base plate in the image to be checked and the pre-configured shape data of the pixels can partially match, and the shape of the one pixel in the image to be checked and the pre-configured shape of the pixels, when being matched, have a difference (for example, deficiency, a foreign matter (particles) and so on exists), then it is considered that they partially match. If the shape data of the one pixel in the displaying base plate in the image to be checked and the pre-configured shape data of the pixels are completely different, then it is considered that they do not match at all.

B3: according to the results of matching, determining a type of the image to be checked.

As an example, this step comprises, on a condition that the product data of the displaying base plate in the image to be checked and the pre-configured product data completely match, determining that the type of the image to be checked is the first image type (i.e., a no-defect image).

As another example, this step comprises, on the condition that the product data of the product in the image to be checked and the pre-configured product data do not match at all, determining that the type of the image to be checked is the second image type (i.e., a blurred image).

As yet another example, this step comprises, on the condition that the product data of the product in the image to be checked and the pre-configured product data partially match, determining that the type of the image to be checked is the third image type (i.e., a defect image).

In other embodiments, the step of determining the type of the image to be checked in S102 may particularly be implemented by the following steps C1-C2.

C1: performing binarization processing to the image to be checked, to obtain a black-and-white graph of the image to be checked.

A person skilled in the art should understand that the binarization processing refers to processing the grayscale values of the points in the image into 0 or 255. In other words, by performing binarization processing to the image to be checked, the entire image to be checked can present an obvious black-and-white effect.

In some embodiments, after the binarization processing has been performed to the image to be checked, the image to be checked may further undergo a shrinkage processing; for example, it may be shrunken to a quarter of the original image. After the shrinkage processing has been done, the shrunken image undergoes the subsequent processing. Because the image to be checked is shrunken, the data processing quantity for the execution of the subsequent steps (for example, the step C2) can be reduced, thereby increasing the processing efficiency of the step C2.

It should be noted that the proportion of the shrinkage is not limited in the present embodiment. For example, the image to be checked may be shrunken to a quarter of the original image, and the image to be checked may also be shrunken to a half of the original image.

C2: according to the black-and-white graph, determining a type of the image to be checked.

In some embodiments, this step comprises, on a condition that the black-and-white graph of the image to be checked has periodical changes, determining that the type of the image to be checked is the first image type (i.e., a no-defect image).

In the present embodiment, after the binarization processing has been performed to the image to be checked, each of the smallest repeating units is processed into a blackness graph, and the grid line and the data line that are connected to each of the smallest repeating units are processed into a whiteness graph.

Figure 4A:
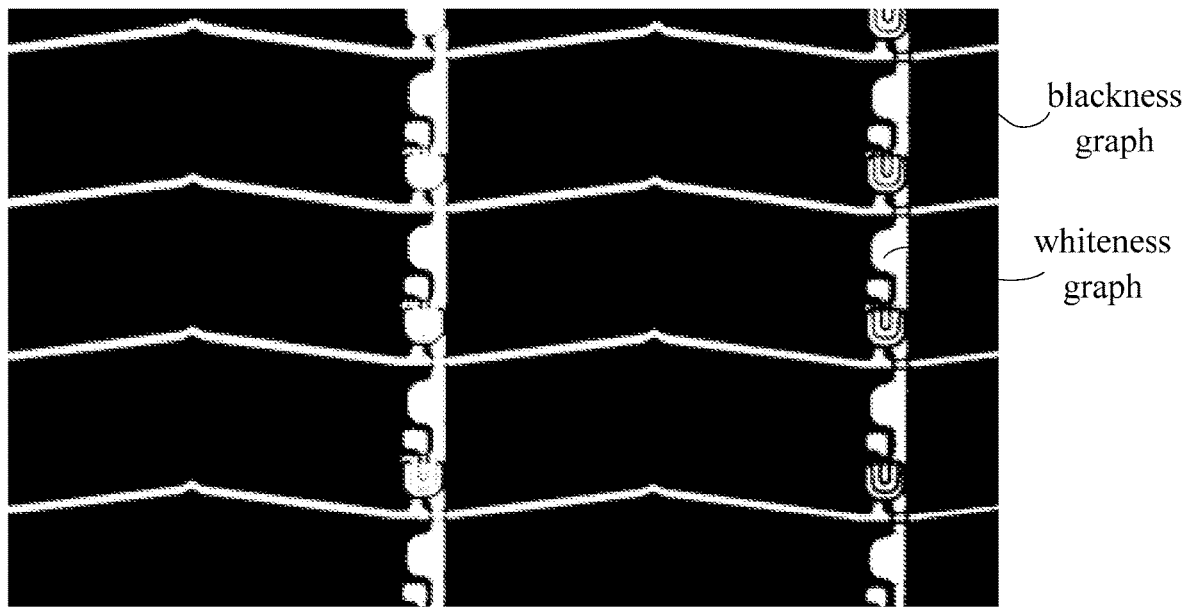
FIG. 4A is an image to be checked of the first image type according to an embodiment of the present disclosure.

As shown in FIG. 4A, that the black-and-white graph of the image to be checked has periodical changes may be comprehended as that, in the row direction, the blackness graphs of each of the smallest repeating units and the whiteness graphs of the grid lines and the data lines that are connected to each of the smallest repeating units are arranged repeatedly. In other words, in the row direction, the blackness graph of one of the smallest repeating units and the whiteness graph of the grid line and the data line that are connected to the smallest repeating unit is the same as all of the blackness graphs of the other smallest repeating units and the whiteness graphs of the grid lines and the data lines that are connected to the smallest repeating units.

In other embodiments, this step comprises, on the condition that the black-and-white graph of the image to be checked partially does not have periodical changes, determining that the type of the image to be checked is the second image type (i.e., a blurred image).

Figure 4B:
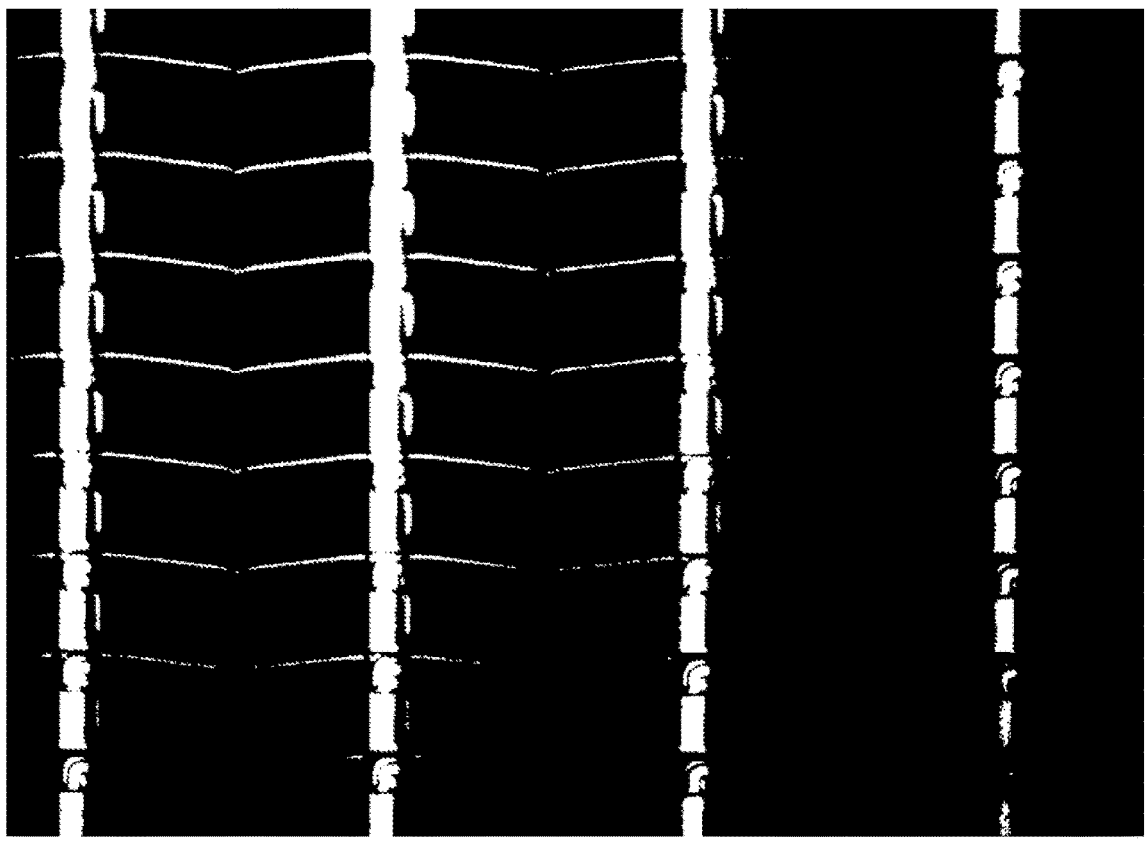
FIG. 4B is an image to be checked of the second image type according to an embodiment of the present disclosure.

In the present embodiment, as shown in FIG. 4B, that the black-and-white graph of the image to be checked partially does not have periodical changes may be comprehended as that, in the row direction, the blackness graphs of each of the smallest repeating units and the whiteness graphs of the grid lines and the data lines that are connected to each of the smallest repeating units are not arranged repeatedly. In other words, in the row direction, the blackness graph of one of the smallest repeating units and the whiteness graph of the grid line and the data line that are connected to the smallest repeating unit is different from the blackness graphs of the other smallest repeating units and the whiteness graphs of the grid lines and the data lines that are connected to the smallest repeating units.

In some other embodiments, this step comprises, on a condition that the black-and-white graph of the image to be checked partially has periodical changes, determining that the type of the image to be checked is the third image type (i.e., a defect image).

Figure 4C:
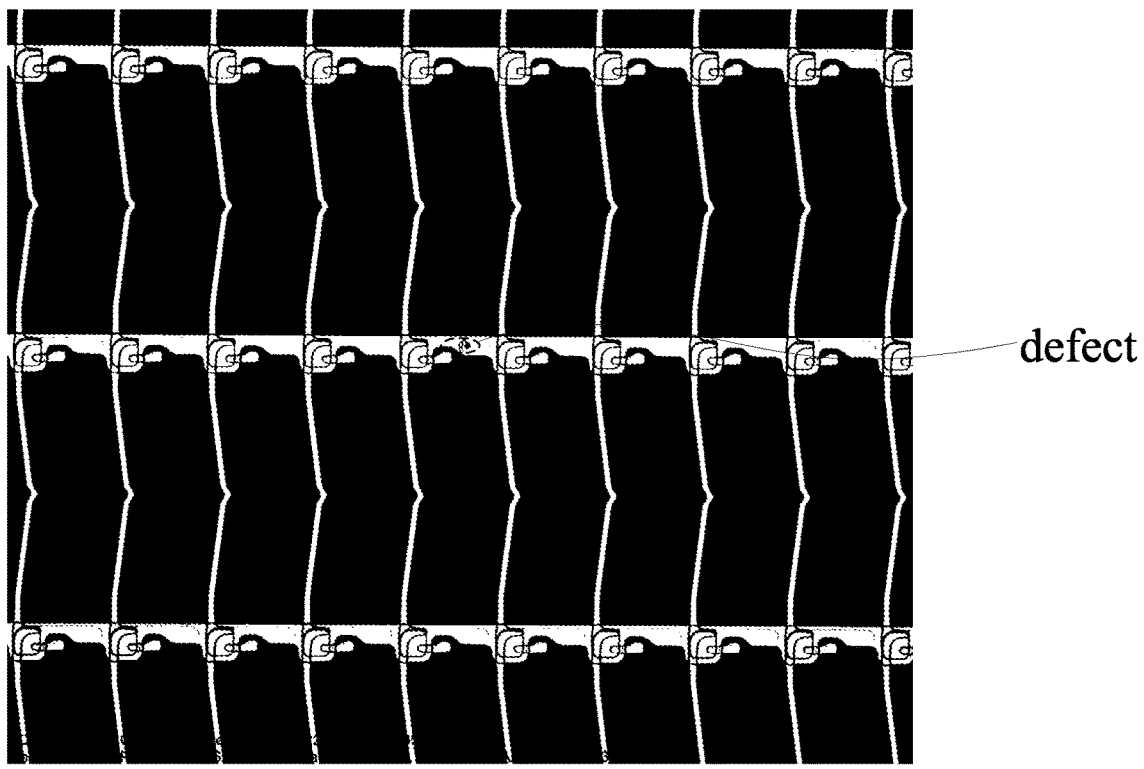
FIG. 4C is an image to be checked of the third image type according to an embodiment of the present disclosure.

In the present embodiment, that the black-and-white graph of the image to be checked does not have periodical changes may be comprehended as that, in the row direction, the blackness graphs of some of the smallest repeating units and the whiteness graphs of the grid lines and the data lines that are connected to the some of the smallest repeating units are arranged repeatedly, while the blackness graphs of the other part of the smallest repeating units and the whiteness graphs of the grid lines and the data lines that are connected to the other part of the smallest repeating units are not arranged repeatedly. As an example, as shown in FIG. 4C, the image to be checked has a defect.

In other embodiments, the step of determining the type of the image to be checked in S102 may particularly be implemented by the following step D1.

D1: by using a second convolutional neural network, determining an image type of the image to be checked.

In the present embodiment, the second convolutional neural network is a convolutional neural network that is obtained after training. Its training process may refer to the method for training a convolutional neural network in the following, and is not discussed here further.

As an example, the convolutional neural network that is obtained after training (for example, the second convolutional neural network) can remember the features corresponding to each of the image types, whereby, after the image to be checked has been inputted into the second convolutional neural network, the second convolutional neural network can be used to determine the image type of the image to be checked.

S103: on a condition that the type of the image to be checked is the third image type, by using a first convolutional neural network, determining defect data of the image to be checked.

An image of the third image type is a defect image, wherein the defect image refers to an image of a displaying base plate having a defect, and the defect data contains a defect type of the displaying base plate in the image to be checked.

In some embodiments, on a condition that the type of the image to be checked is the third image type, the apparatus for classifying an image of a displaying base plate, based on the determined defect data of the image to be checked, marks the defect position and the defect size of the image to be checked.

Figure 5:
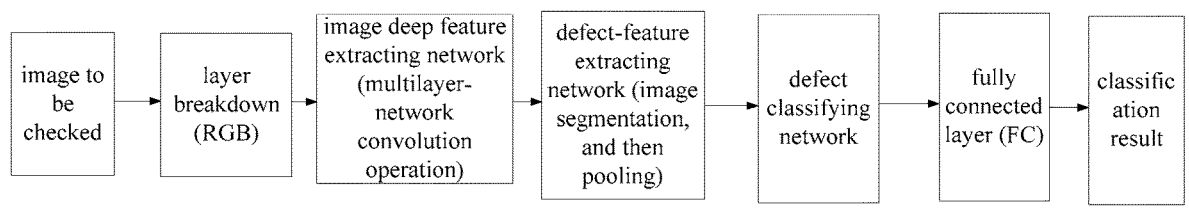
FIG. 5 is a flow chart of the determination of the defect data of the image to be checked according to an embodiment of the present disclosure.

As an example, as shown in FIG. 5, the process comprises breaking down the image to be checked, to break down it into three layers of RGB, inputting into the first convolutional neural network, and, by using the image deep feature extracting network comprised in the first convolutional neural network, performing multilayer-network convolution operation to extract the image features, to form a network-characteristic diagram; performing, by using a defect-feature extracting network, segmentation and pooling to the image deep network-characteristic diagram, and subsequently performing defect-feature extraction, to extract the image defect features; by using a defect classifying network, classifying the defect features of the image-defect region, and determining whether that region has a defect; and outputting the defect classification result via the output terminal of the fully connected layer, and the output result comprises two parts: the classification result of the defect and the position of the defect region (the coordinate data, and data such as the width and the height of the defect region).

In the present embodiment, the apparatus for classifying an image of a displaying base plate further saves the priorities corresponding to the defect types. When the apparatus for classifying an image of a displaying base plate has determined that the defect types of the displaying base plate in the image to be checked include two defect types, the apparatus for classifying an image of a displaying base plate, according to the degrees of the priorities, preferentially outputs the defect type corresponding to the higher priority.

In the present embodiment, the method may comprise training the convolutional neural network, and, by using the convolutional neural network that has been trained, determining the defect type of the displaying base plate in the image to be checked. The training process of the convolutional neural network may refer to the method for training a convolutional neural network in the following, and is not discussed here further.

In some embodiments, the step of, by using the first convolutional neural network, determining the defect data of the image to be checked in S103 may particularly comprise: by using a first convolutional neural network, on a condition that the defect type of the image to be checked is in a second predetermined-type set, determining from the second predetermined-type set the defect type of the image to be checked; and on a condition that the defect type of the image to be checked is not in the second predetermined-type set, outputting the image to be checked, and receiving a first newly created defect type that is inputted by a user.

The second predetermined-type set comprises at least one defect type. As an example, the defect types may include Remain (residue), Open (open circuit) and Short (short circuit). The defect type of Open may particularly include Gate Open (open circuit of the grid lines), SD Open (open circuit of the data lines), PVX Open (open circuit of the passivation layer) and so on.

As an example, when the second predetermined-type set comprises Remain, Open and Short, and it is determined that the defect type of the image to be checked is PT (Particle), because that is not a defect type comprised in the second predetermined-type set, the first convolutional neural network outputs the image to be checked, and, by using artificial image determination, determines the defect type of the image to be checked. After the defect type of the image to be checked (i.e., the first newly created defect type) has been artificially determined, the artificially determined defect type of the image to be checked is inputted into the first convolutional neural network.

In some embodiments, after the apparatus for classifying an image of a displaying base plate has received the first newly created defect type inputted by the user, the method for classifying an image of a displaying base plate according to the embodiments of the present disclosure further comprises the following step 2.

Step 2: adding the first newly created defect type into the second predetermined-type set, to update the first convolutional neural network.

As an example, after the user has determined the first newly created defect type, the first newly created defect type is inputted into the first convolutional neural network, to update the first convolutional neural network.

In some embodiments, the defect data further comprises: a confidence corresponding to the defect type, wherein the confidence corresponding to the defect type refers to a confidence with which the displaying base plate in the image to be checked is of the defect type.

As an example, the first convolutional neural network, after determining the defect type of the displaying base plate in the image to be checked, outputs the confidence with which the displaying base plate in the image to be checked is of the determined defect type. The confidence is the accuracy with which the displaying base plate in the image to be checked that is determined by the first convolutional neural network is of the defect type that it determines.

In some embodiments, on a condition that the confidence is less than a preset threshold, the apparatus for classifying an image of a displaying base plate outputs the image to be checked, and receives a rechecking result that is inputted by the user; and on a condition that the rechecking result indicates that the defect type in the defect data of the image to be checked is incorrect, according to the rechecking result, rectifies the defect type in the defect data of the image to be checked.

Figure 6:
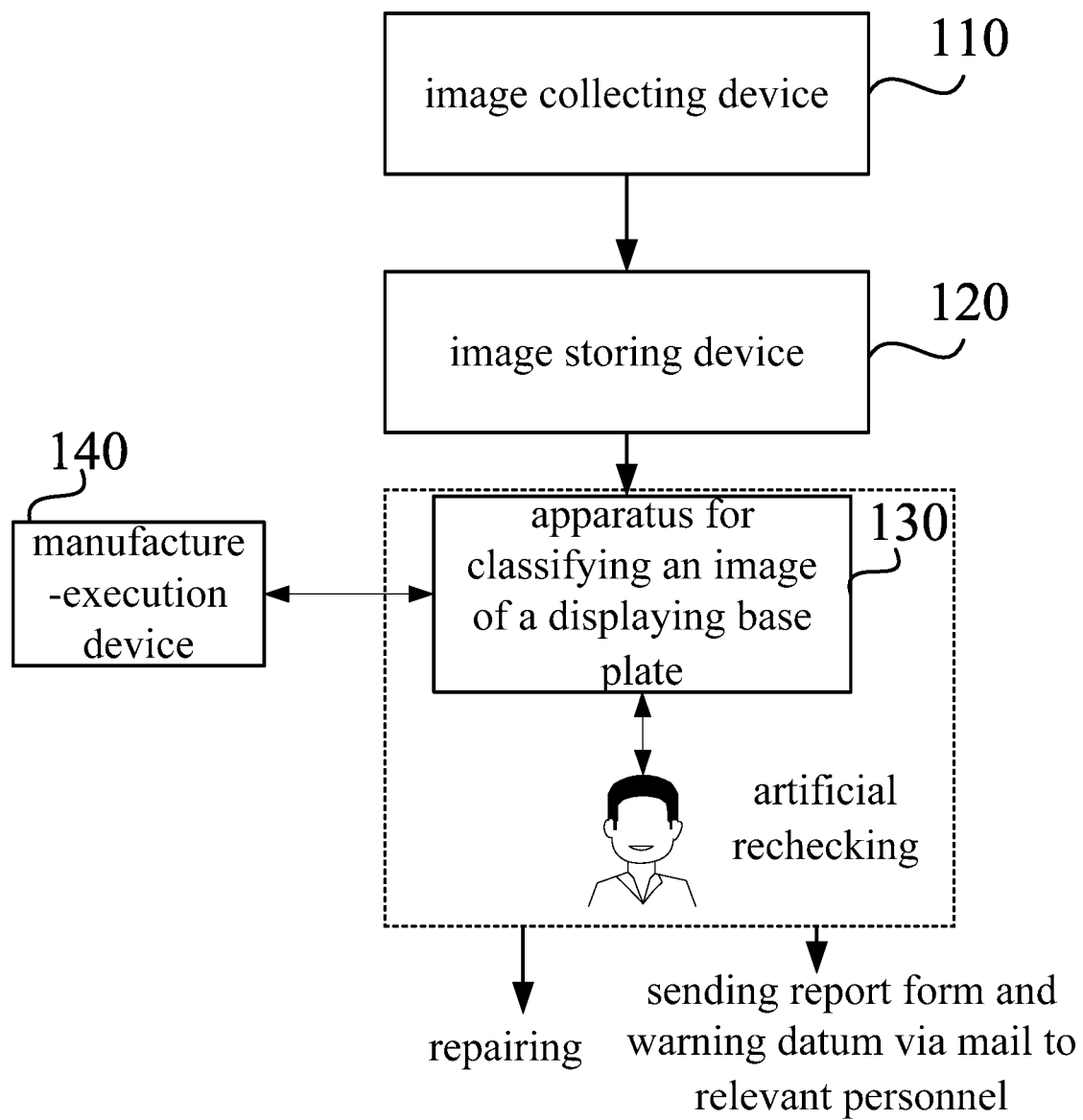
FIG. 6 is a schematic diagram of the method for classifying an image of a displaying base plate according to an embodiment of the present disclosure.

As an example, as shown in FIG. 6, if the confidence corresponding to the defect type in the defect data of the image to be checked is less than a preset threshold, the first convolutional neural network outputs the image to be checked, and the defect type of the image to be checked is determined in the artificial manner (i.e., artificial rechecking). After the defect type (i.e., the rechecking result) has been artificially determined, the rechecking result is inputted into the first convolutional neural network. If the rechecking result is different from the defect type of the image to be checked outputted by the first convolutional neural network, then the first convolutional neural network, according to the rechecking result, rectifies the defect type in the defect data of the image to be checked.

It should be noted that the numerical value of the preset threshold is not limited in the present embodiment. For example, the preset threshold may be 0.6, and may also be 0.7.

In some embodiments, as shown in FIG. 6, after the apparatus for classifying an image of a displaying base plate 130 has determined the type of the image to be checked, the apparatus for classifying an image of a displaying base plate 130 sends the type of the image to be checked to the manufacture-execution device 140. The manufacture-execution device 140, after receiving the type of the image to be checked, firstly locks the received image to be checked (Hold), and then, in the Hold state, according to the type of the received image to be checked, determines which station it flows this lot of images to be checked into. For example, if the determined type of the image to be checked is the first image type (i.e., a no-defect image), it flows the image to be checked into the station of the next process step. If the determined type of the image to be checked is the third image type (i.e., a defect image), and it is determined that the defect type of the image to be checked is of the defect types comprised in the second predetermined-type set, the manufacture-execution device 140 flows the image to be checked into the repairing stations corresponding to each of the defect types, to repair the displaying base plate in the image to be checked. After repairing the displaying base plate in the defect image, the manufacture-execution device feeds back the repairing data (for example, the repairing result) to the apparatus for classifying an image of a displaying base plate.

As an example, when the images to be checked are the images PA1-PA25 of the products A1-A25, the types of the images PA1-PA10 are no-defect images, and the types of the images PA11-PA25 are defect images, the manufacture-execution device, after receiving those images, firstly locks those images (Hold), and then, in the Hold state, flows the images PA1-PA10 into the next station, and flows the images P11-P25 into the repairing station.

In other embodiments, as shown in FIG. 6, the apparatus for classifying an image of a displaying base plate 130 sends a report form and warning data via a mail to the relevant personnel. The report form may show the classification result in the formats such as tables and charts.

In some embodiments, when the second predetermined-type set comprises the defect types of Remain, Open and Short, the priorities corresponding to each of the defect types are different, wherein if the incidence of a defect type is higher, and the order of severity caused by the defect type to the yield of the displaying base plate is higher, its priority is higher. As an example, the ranks of the priorities of the three defect types of Remain, Open and Short are: Open>Remain>Short.

The present embodiment provides a method for training a convolutional neural network. The method for training a convolutional neural network may comprise the following steps E1-E7.

E1: acquiring images to be learnt.

The images to be learnt refer to images that are of a certain defect type and are determined in an artificial manner.

In the present embodiment, the priorities of each of the defect types (i.e., the incidences of each of the defect types) are different, and the convolutional neural network may firstly acquire the images to be learnt corresponding to the defect type having a higher priority. That can enable the convolutional neural network to preferentially process the defect type having a higher incidence.

As an example, firstly, by using artificial image determination, 1000 defect images of the type of Open are selected, and inputted into the convolutional neural network.

E2: classifying the images to be learnt into a training set and a validation set.

The images in the training set and in the validation set are different, and the ratio of those in the training set to those in the validation set is usually 4:1.

As an example, when the images to be learnt are 1000 images, the quantity of the images to be learnt in the training set may be 800, and the quantity of the images to be learnt in the validation set may be 200.

It should be noted that the quantities of the images comprised in the training set and the validation set are not limited in the present embodiment. For example, the quantity of the images to be learnt in the training set may be greater than 500, and the remaining images may be used as the validation set.

E3: by using the images to be learnt in the training set, training a third convolutional neural network, to obtain the first convolutional neural network.

As an example, by using the images to be learnt in the training set, the third convolutional neural network is trained, thereby obtaining the first convolutional neural network that has been trained.

As an example, the process may comprise inputting the images to be learnt into the third convolutional neural network, using the weights of the parameters of the third convolutional neural network as the first weight values, and outputting by the third convolutional neural network the classification result; subsequently evaluating the classification result by using the types of the images to be learnt inputted by the user, to obtain an evaluation result; and, according to the evaluation result, using the weights of the parameters of the third convolutional neural network as the second weight values, thereby obtaining the third convolutional neural network that has been updated.

In some embodiments, the third convolutional neural network may comprise 5 convolutional layers, 5 pooling layers and 2 fully connected layers. The connection mode of the predetermined convolutional neural network may be: a first convolutional layer, a first pooling layer, a second convolutional layer, a second pooling layer, a third convolutional layer, a third pooling layer, a fourth convolutional layer, a fourth pooling layer, a fifth convolutional layer, a fifth pooling layer, a first fully connected layer and a second fully connected layer.

E4: by using the first convolutional neural network, determining the defect type of each of the images to be learnt in the validation set.

E5: acquiring the defect type of each of the images to be learnt in the validation set inputted by the user.

As an example, the user judges the images to be learnt in the validation set, to determine the defect types of those images to be checked.

E6: calculating the precision, wherein $$\text{precision} = \frac{TP}{TP+FP},$$

wherein TP (True Positive) refers to the quantity of the images that are predicted to be positive and are actually positive, and FP (False Positive) refers to the quantity of the images that are predicted to be positive and are actually negative.

As an example, taking the case as an example in which the defect type is the Remain defect, TP refers to the quantity of the images for whom the defect type of the image determined by the user is the Remain defect, and the defect type of the image predicted by the first convolutional neural network is also the Remain defect, and FP refers to the quantity of the images for whom the defect type of the image predicted by the first convolutional neural network is the Remain defect, but the actual defect type of the image determined by the user is not the Remain defect.

E7: calculating the recall rate $$\text{Recall} = \frac{TP}{TP+FN}.$$

FN (False Negative) refers to the quantity of the images that are predicted to be negative and are actually positive.

As an example, taking the case as an example in which the defect type is the Remain defect, FN refers to the quantity of the images for whom the defect type of the image predicted by the first convolutional neural network is not the Remain defect, but the actual defect type of the image determined by the user is the Remain defect.

In the present embodiment, when the precision and the recall rate reach preset values, the convolutional neural network that has been trained may be used to classify the image. Correspondingly, when the precision and the recall rate do not reach the preset values, the convolutional neural network continues to be trained, till the precision and the recall rate reach the preset values.

It should be noted that the numerical values of the preset values are not limited in the present embodiment. As an example, the preset values may be 0.7. As another example, the preset values may be 0.8.

Figure 7:
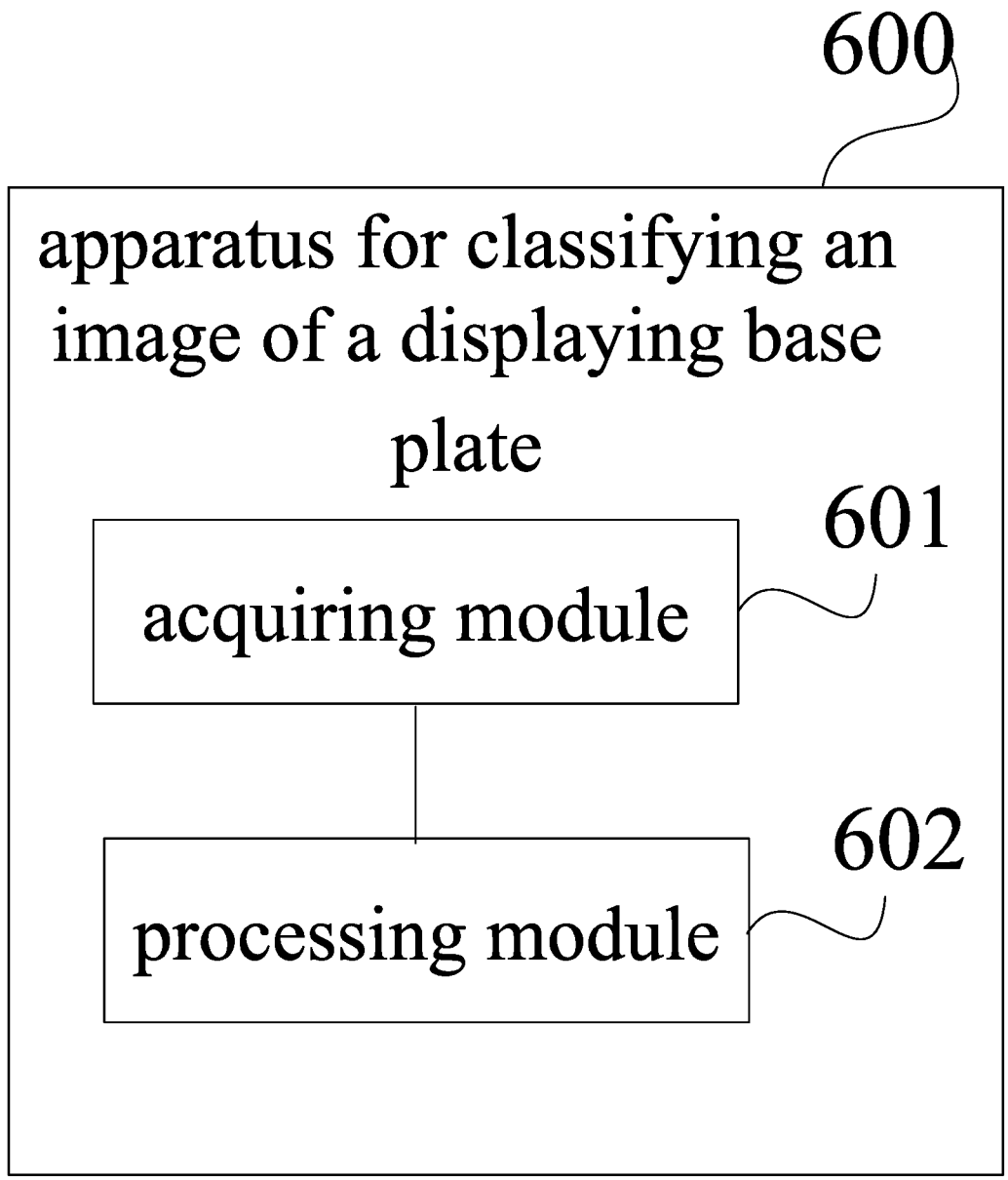
FIG. 7 is a structural diagram of the apparatus for classifying an image of a displaying base plate according to an embodiment of the present disclosure.

As shown in FIG. 7, the present embodiment provides an apparatus for classifying an image of a displaying base plate 600. The apparatus for classifying an image of a displaying base plate 600 may comprise an acquiring module 601 and a processing module 602. The acquiring module 601 is configured for acquiring an image to be checked. The processing module 602 is configured for, from a first predetermined-type set, determining the type of the image to be checked acquired by the acquiring module 601, wherein the first predetermined-type set comprises: a first image type, a second image type and a third image type, wherein an image of the first image type is a no-defect image, an image of the second image type is a blurred image, and an image of the third image type is a defect image. The processing module 602 is further configured for, on a condition that the type of the image to be checked is the third image type, by using a first convolutional neural network, determining a defect data of the image to be checked, wherein the defect image refers to an image of a displaying base plate having a defect, and the defect data contains a defect type of the displaying base plate in the image to be checked.

In some embodiments, the processing module 602 is particularly configured for acquiring product data of the displaying base plate in the image to be checked, wherein the product data comprises: shape data and/or structure data of the displaying base plate; and the processing module 602 is particularly configured for matching the product data of the displaying base plate in the image to be checked with a pre-configured product data; on a condition that the product data of the displaying base plate in the image to be checked and the pre-configured product data completely match, determining that the type of the image to be checked is the first image type; on a condition that the product data of the displaying base plate in the image to be checked and the pre-configured product data do not match at all, determining that the type of the image to be checked is the second image type; and on a condition that the product data of the displaying base plate in the image to be checked and the pre-configured product data partially match, determining that the type of the image to be checked is the third image type.

In some embodiments, the processing module 602 is particularly configured for, by using an image-recognition algorithm, acquiring shape data and/or a structure data of pixels in the displaying base plate in the image to be checked.

In some embodiments, the processing module 602 is particularly configured for performing binarization processing to the image to be checked, to obtain a black-and-white graph of the image to be checked; on a condition that the black-and-white graph of the image to be checked has periodical changes, determining that the type of the image to be checked is the first image type; on a condition that the black-and-white graph of the image to be checked does not have periodical changes, determining that the type of the image to be checked is the second image type; and on a condition that the black-and-white graph of the image to be checked partially has periodical changes, determining that the type of the image to be checked is the third image type.

In some embodiments, the processing module 602 is particularly configured for, by using a second convolutional neural network, determining an image type of the image to be checked.

In some embodiments, the acquiring module 601 is particularly configured for scanning an image storing device; determining that a newly added image-information storage file exists in the image storing device, wherein the image-information storage file includes an image file and an address file; parsing the address file in the image-information storage file, to obtain an image storage address in the address file; and acquiring from the image file an image corresponding to the image storage address, as the image to be checked.

In some embodiments, the processing module 602 is particularly configured for, by using a first convolutional neural network, determining from the second predetermined-type set the defect type of the image to be checked, wherein the second predetermined-type set comprises at least one defect type. The processing module 602 is further configured for, on a condition that the defect type of the image to be checked is not in the second predetermined-type set, outputting the image to be checked, and receiving a first newly created defect type that is inputted by a user.

In some embodiments, the apparatus for classifying an image of a displaying base plate according to the present embodiment further comprises: an updating module, wherein the updating module is configured for adding the first newly created defect type into the second predetermined-type set, to update the first convolutional neural network.

In some embodiments, the defect data further comprises: a confidence corresponding to the defect type, wherein the confidence corresponding to the defect type refers to a confidence with which the displaying base plate in the image to be checked is of the defect type. The processing module 602 is further configured for, on a condition that the confidence is less than a preset threshold, outputting the image to be checked, and receiving a rechecking result that is inputted by the user.

The apparatus for classifying an image of a displaying base plate according to the present embodiment further comprises: a rectifying module, wherein the rectifying module is configured for, on a condition that the rechecking result indicates that the defect type in the defect data of the image to be checked is incorrect, according to the rechecking result, rectifying the defect type in the defect data of the image to be checked.

An embodiment of the present disclosure further provides an apparatus for classifying an image of a displaying base plate, for example, a server. The apparatus for classifying an image of a displaying base plate may comprise a memory and a processor, the memory is configured to store a computer instruction, and the processor is configured to execute the computer instruction, to cause the apparatus for classifying an image of a displaying base plate to implement the method for classifying an image of a displaying base plate according to the above embodiments.

An embodiment of the present disclosure further provides a computer-readable storage medium, wherein the computer-readable storage medium is configured to store a computer instruction, whereby an apparatus for classifying an image of a displaying base plate (for example, a server), when executing the computer instruction, implements the method for classifying an image of a displaying base plate according to any one of the above embodiments. The computer-readable storage medium may include a read-only memory (ROM), a random access memory (RAM), a diskette, an optical disc and so on.

Figure 8:
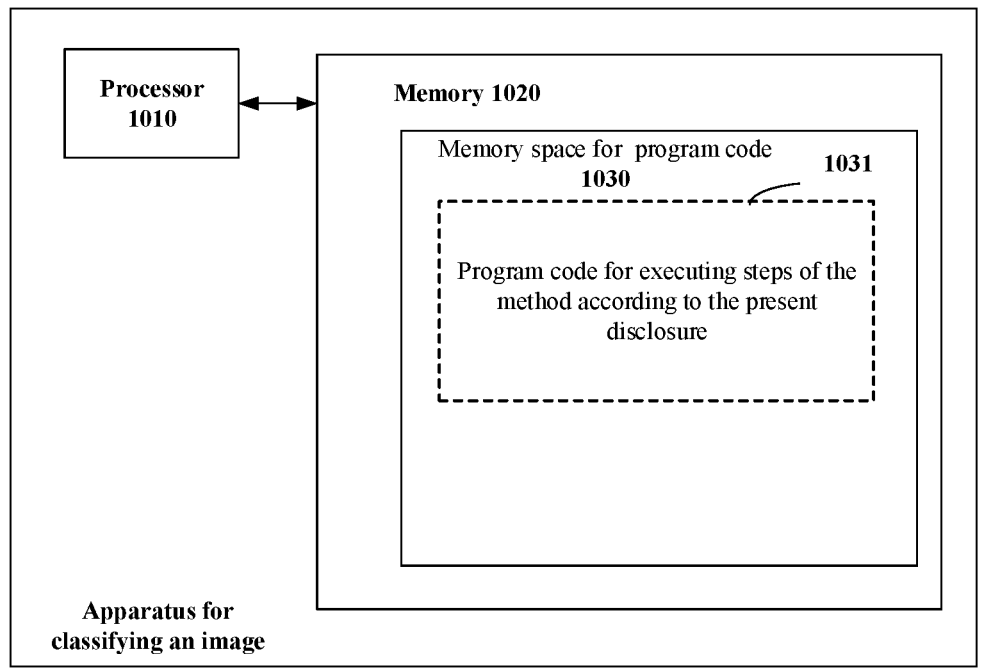
FIG. 8 schematically illustrates a block diagram of the apparatus for classifying an image for performing the method according to the present disclosure.
Figure 9:
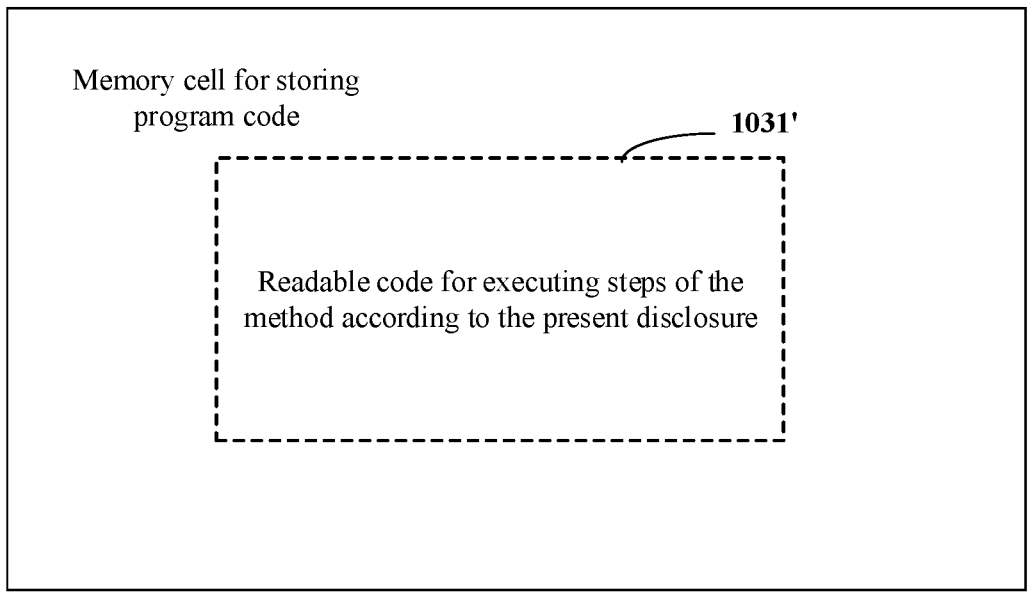
FIG. 9 schematically illustrates a memory cell for maintaining or carrying a program code for implementing the method according to the present disclosure.

For example, FIG. 8 shows an apparatus for classifying an image that can implement the method according to the present application. The apparatus for classifying an image traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 9. Such computer program products are usually portable or fixed storage units. The storage unit may have storage segments or storage spaces with similar arrangement to the memory 1020 of the apparatus for classifying an image in FIG. 8. The program codes may for example be compressed in a suitable form. Generally, the storage unit contains a computer-readable code 1031', which can be read by a processor like 1010. When those codes are executed by the apparatus for classifying an image, the codes cause the apparatus for classifying an image to implement each of the steps of the method described above.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for classifying an image of a displaying base plate, wherein the method comprises:
   acquiring an image to be checked;
   from a first predetermined-type set, determining a type of the image to be checked, wherein the first predetermined-type set comprises: a first image type, a second image type and a third image type, wherein an image of the first image type is a no-defect image, an image of the second image type is a blurred image, and an image of the third image type is a defect image; and
   on a condition that the type of the image to be checked is the third image type, by using a first convolutional neural network, determining defect data of the image to be checked, wherein the defect image refers to an image of a displaying base plate having a defect, and the defect data contains a defect type of the displaying base plate in the image to be checked;
   wherein the step of, by using a first convolutional neural network, determining the defect data of the image to be checked comprises:
   by using the first convolutional neural network, on a condition that the defect type of the image to be checked is in a second predetermined-type set, determining the defect type of the image to be checked from the second predetermined-type set, wherein the second predetermined-type set comprises at least one defect type; and
   on a condition that the defect type of the image to be checked is not in the second predetermined-type set, outputting the image to be checked, and receiving a first newly created defect type that is inputted by a user.

2. The method for classifying an image of a displaying base plate according to claim 1, wherein
   the step of determining the type of the image to be checked comprises:
   acquiring product data of the displaying base plate in the image to be checked, wherein the product data comprises: shape data and/or structure data of the displaying base plate;
   matching the product data of the displaying base plate in the image to be checked with a pre-configured product data;
   on a condition that the product data of the displaying base plate in the image to be checked and the pre-configured product data completely match, determining that the type of the image to be checked is the first image type;
   on a condition that the product data of the displaying base plate in the image to be checked and the pre-configured product data do not match at all, determining that the type of the image to be checked is the second image type; and
   on a condition that the product data of the displaying base plate in the image to be checked and the pre-configured product data partially match, determining that the type of the image to be checked is the third image type.

3. The method for classifying an image of a displaying base plate according to claim 2, wherein the step of acquiring the product data of the displaying base plate in the image to be checked comprises:
   by using an image-recognition algorithm, acquiring shape data and/or structure data of pixels in the displaying base plate in the image to be checked.

4. The method for classifying an image of a displaying base plate according to claim 1, wherein
   the step of determining the type of the image to be checked comprises:
   performing binarization processing to the image to be checked, to obtain a black-and-white graph of the image to be checked;
   on a condition that the black-and-white graph of the image to be checked has periodical changes, determining that the type of the image to be checked is the first image type;
   on a condition that the black-and-white graph of the image to be checked does not have periodical changes, determining that the type of the image to be checked is the second image type; and
   on a condition that the black-and-white graph of the image to be checked partially has periodical changes, determining that the type of the image to be checked is the third image type.

5. The method for classifying an image of a displaying base plate according to claim 1, wherein
   the step of acquiring the image to be checked comprises:
   scanning an image storing device;
   determining that a newly added image-information storage file exists in the image storing device, wherein the image-information storage file includes an image file and an address file;
   parsing the address file in the image-information storage file, to obtain an image storage address in the address file; and
   acquiring an image corresponding to the image storage address from the image file, to regard the image as the image to be checked.

6. The method for classifying an image of a displaying base plate according to claim 1, wherein
   the method further comprises:
   adding the first newly created defect type into the second predetermined-type set, to update the first convolutional neural network.

7. The method for classifying an image of a displaying base plate according to claim 6, wherein
   the defect data further comprises: a confidence corresponding to the defect type, wherein the confidence corresponding to the defect type refers to a confidence with which the displaying base plate in the image to be checked is of the defect type; and
   the method further comprises
   on a condition that the confidence is less than a preset threshold, outputting the image to be checked, and receiving a rechecking result that is inputted by the user; and
   on a condition that the rechecking result indicates that the defect type in the defect data of the image to be checked is incorrect, according to the rechecking result, rectifying the defect type in the defect data of the image to be checked.

8. The method for classifying an image of a displaying base plate according to claim 1, wherein
   the step of determining the type of the image to be checked comprises:
   by using a second convolutional neural network, determining an image type of the image to be checked.

9. An apparatus for classifying an image of a displaying base plate, wherein the apparatus comprises a memory and a processor, the memory is configured to store a computer instruction, and the processor is configured to execute the computer instruction, to cause the apparatus for classifying an image of the displaying base plate to implement the operations comprising:
- acquiring an image to be checked;
- from a first predetermined-type set, determining a type of the image to be checked, wherein the first predetermined-type set comprises: a first image type, a second image type and a third image type, wherein an image of the first image type is a no-defect image, an image of the second image type is a blurred image, and an image of the third image type is a defect image; and
- on a condition that the type of the image to be checked is the third image type, by using a first convolutional neural network, determining defect data of the image to be checked, wherein the defect image refers to an image of a displaying base plate having a defect, and the defect data contains a defect type of the displaying base plate in the image to be checked;
- wherein the step of, by using a first convolutional neural network, determining the defect data of the image to be checked comprises:
- by using the first convolutional neural network, on a condition that the defect type of the image to be checked is in a second predetermined-type set, determining the defect type of the image to be checked from the second predetermined-type set, wherein the second predetermined-type set comprises at least one defect type; and
- on a condition that the defect type of the image to be checked is not in the second predetermined-type set, outputting the image to be checked, and receiving a first newly created defect type that is inputted by a user.

10. The apparatus for classifying an image of the displaying base plate according to claim 9, wherein
the operation of determining the type of the image to be checked comprises:
- acquiring product data of the displaying base plate in the image to be checked, wherein the product data comprises: shape data and/or structure data of the displaying base plate;
- matching the product data of the displaying base plate in the image to be checked with a pre-configured product data;
- on a condition that the product data of the displaying base plate in the image to be checked and the pre-configured product data completely match, determining that the type of the image to be checked is the first image type;
- on a condition that the product data of the displaying base plate in the image to be checked and the pre-configured product data do not match at all, determining that the type of the image to be checked is the second image type; and
- on a condition that the product data of the displaying base plate in the image to be checked and the pre-configured product data partially match, determining that the type of the image to be checked is the third image type.

11. The apparatus for classifying an image of the displaying base plate according to claim 10, wherein the operation of acquiring the product data of the displaying base plate in the image to be checked comprises:
- by using an image-recognition algorithm, acquiring shape data and/or structure data of pixels in the displaying base plate in the image to be checked.

12. The apparatus for classifying an image of a displaying base plate according to claim 9, wherein
the operation of determining the type of the image to be checked comprises:
- performing binarization processing to the image to be checked, to obtain a black-and-white graph of the image to be checked;
- on a condition that the black-and-white graph of the image to be checked has periodical changes, determining that the type of the image to be checked is the first image type;
- on a condition that the black-and-white graph of the image to be checked does not have periodical changes, determining that the type of the image to be checked is the second image type; and
- on a condition that the black-and-white graph of the image to be checked partially has periodical changes, determining that the type of the image to be checked is the third image type.

13. The apparatus for classifying an image of a displaying base plate according to claim 9, wherein
the operation of acquiring the image to be checked comprises:
- scanning an image storing device;
- determining that a newly added image-information storage file exists in the image storing device, wherein the image-information storage file includes an image file and an address file;
- parsing the address file in the image-information storage file, to obtain an image storage address in the address file; and
- acquiring an image corresponding to the image storage address from the image file, to regard the image as the image to be checked.

14. The apparatus for classifying an image of a displaying base plate according to claim 9, wherein
the operation of determining the type of the image to be checked comprises:
- by using a second convolutional neural network, determining an image type of the image to be checked.

15. A non-transitory computer-readable storage medium, wherein the computer-readable storage medium is configured to store a computer instruction, whereby an apparatus for classifying an image of a displaying base plate, when executing the computer instruction, implements the operations comprising:
- acquiring an image to be checked;
- from a first predetermined-type set, determining a type of the image to be checked, wherein the first predetermined-type set comprises: a first image type, a second image type and a third image type, wherein an image of the first image type is a no-defect image, an image of the second image type is a blurred image, and an image of the third image type is a defect image; and
- on a condition that the type of the image to be checked is the third image type, by using a first convolutional neural network, determining defect data of the image to be checked, wherein the defect image refers to an image of a displaying base plate having a defect, and the defect data contains a defect type of the displaying base plate in the image to be checked;
- wherein the step of, by using a first convolutional neural network, determining the defect data of the image to be checked comprises:
- by using the first convolutional neural network, on a condition that the defect type of the image to be checked is in a second predetermined-type set, determining the defect type of the image to be checked from the second predetermined-type set, wherein the second predetermined-type set comprises at least one defect type; and on a condition that the defect type of the image to be checked is not in the second predetermined-type set, outputting the image to be checked, and receiving a first newly created defect type that is inputted by a user.

16. The storage medium according to claim 15, wherein the operation of determining the type of the image to be checked comprises:

acquiring product data of the displaying base plate in the image to be checked, wherein the product data comprises: shape data and/or structure data of the displaying base plate;

matching the product data of the displaying base plate in the image to be checked with a pre-configured product data;

on a condition that the product data of the displaying base plate in the image to be checked and the pre-configured product data completely match, determining that the type of the image to be checked is the first image type;

on a condition that the product data of the displaying base plate in the image to be checked and the pre-configured product data do not match at all, determining that the type of the image to be checked is the second image type; and on a condition that the product data of the displaying base plate in the image to be checked and the pre-configured product data partially match, determining that the type of the image to be checked is the third image type.

17. The storage medium according to claim 16, wherein the operation of acquiring the product data of the displaying base plate in the image to be checked comprises:

by using an image-recognition algorithm, acquiring shape data and/or structure data of pixels in the displaying base plate in the image to be checked.

18. The storage medium according to claim 15, wherein the operation of determining the type of the image to be checked comprises:

performing binarization processing to the image to be checked, to obtain a black-and-white graph of the image to be checked;

on a condition that the black-and-white graph of the image to be checked has periodical changes, determining that the type of the image to be checked is the first image type;

on a condition that the black-and-white graph of the image to be checked does not have periodical changes, determining that the type of the image to be checked is the second image type; and on a condition that the black-and-white graph of the image to be checked partially has periodical changes, determining that the type of the image to be checked is the third image type.

19. The storage medium according to claim 15, wherein the operation of determining the type of the image to be checked comprises:

by using a second convolutional neural network, determining an image type of the image to be checked.

* * * * *